April 10, 1962 E. A. QUADE 3,029,416

HIGH SPEED MAGNETIC DRUM

Filed Dec. 30, 1957 2 Sheets-Sheet 1

INVENTOR.
EDWARD. A. QUADE

BY Hansen and Lane

ATTORNEYS

April 10, 1962 E. A. QUADE 3,029,416

HIGH SPEED MAGNETIC DRUM

Filed Dec. 30, 1957 2 Sheets-Sheet 2

INVENTOR.
EDWARD A. QUADE

BY Hansen and Lane

ATTORNEYS

United States Patent Office 3,029,416

Patented Apr. 10, 1962

3,029,416

HIGH SPEED MAGNETIC DRUM

Edward A. Quade, San Jose, Calif., assignor to International Business Machines Corporation, New York, N.Y., a corporation of New York Filed Dec. 30, 1957, Ser. No. 706,006
11 Claims. (Cl. 340—174.1)

The present invention relates to magnetic data storage mechanism having an ultra high speed magnetic coated rotor mounted in an air bearing and driven by air jets.

Electrical and electronic calculating and other mechanisms commonly employ random access mechanisms comprising a rotor, such as a disk or drum, coated with magnetic material, and with one or more transducer heads mounted closely adjacent the magnetic rotor coating. Since the coating may be applied by various means, including plating, the term "coating" as used herein shall mean "coating and/or plating."

Energizing the transducer heads at predetermined points along the paths which they follow during rotation of the rotor produces or "writes" magnetic data bits in the drum coating, while the energization of the transducer heads by such magnetic data bits on successive rotations of the rotor is used to receive or "read" these data bits.

The utility of such a random access mechanism is extended by the data storage capacity and speed of operation thereof. Constant efforts have, therefore, been made to improve these two factors of such mechanisms.

It is well known that in recording and reading transducer heads of the type employed with mechanisms of this nature, their magnetic fields expand as they leave the heads. Therefore, the closer a head can be positioned to the recording surface, the smaller and more definite will be the data bit produced therein, and the more distinct and positive will be the action of such data bit on the head for reading.

In the past, it has been common practice to journal drums for such random access mechanisms on either oil lubricated or ball bearings, and to bring the magnetic coated recording surface into the truest practicable coaxial relation therewith. However, since the recording heads are mounted on a stationary member alongside the drum periphery, the difficulty in securing an alignment and concentricity of the drum within even a few thousandths of an inch is at once apparent. Furthermore, it has been necessary to make such prior rotors strong enough to withstand radial expansion under the stress of centrifugal force generated by rotation of the drum. Since the heads are mounted at most within a few thousandths of an inch of the drum surface, and frequently within .0005″ thereof, even such small amounts of expansion of the rotor would bring it into frictional contact with the heads.

An object of the present invention is to provide a magnetic data storage mechanism wherein a drum having a magnetic coated peripheral surface is journaled and contained within an air bearing, and is driven by air jets impinging on the inner surface of the drum at an angle to a radial plane of the drum approaching tangency to the inner drum surface. The invention also provides a magnetic data storage drum of thin wall construction journaled by an air bearing within a strong, rigid, bearing member which retains the drum against radial expansion while said drum is driven at extremely high speed by air jets impinging against the inner surface of the drum. A further object of the invention is to journal a hollow, barrel-shaped, air driven, magnetic storage drum in an air bearing within a strong, rigid bearing member.

A still further object of the invention is to journal an air driven magnetic data storage drum in an air bearing within a strong, rigid bearing member substantially longer than the drum, and to position the drum in predetermined position lengthwise of the bearing by means of an adjustable air cushion provided at one end of the bearing member.

These, and other objects of the invention, will be apparent from the following description and the accompanying drawings, wherein.

Figures 1, 2, 3:
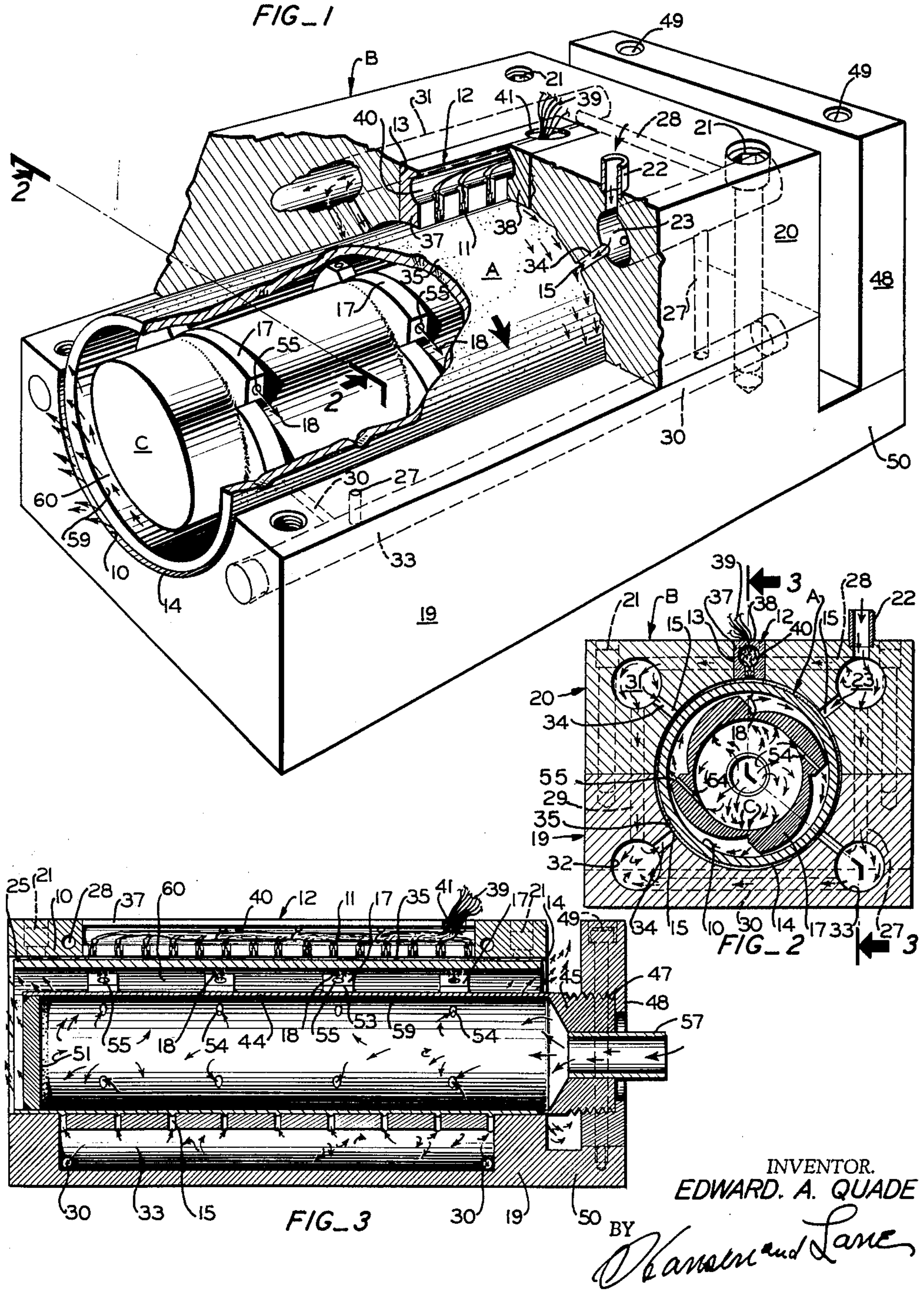
FIG. 1 is a perspective view of a magnetic data storage mechanism embodying the present invention, portions being broken away.
FIG. 2 is a transverse sectional view taken along line 2—2 of FIG. 1.
FIG. 3 is a sectional view taken along the offset line 3—3 of FIG. 2.

Briefly, the form of the invention shown in FIGS. 1–3 comprises a magnetic coated tubular drum A journaled with air bearing support within the bearing bore 10 of a strong, rigid, bearing member B. A plurality of transducer heads 11 are sealed in an insert 12 which in turn is fitted and sealed into an opening 13 provided in the bearing member B.

Pressurized air for providing air bearing support for the drum A is introduced into a bearing clearance space 14 between the drum A and bearing B through jet orifices 15.

Although the term "air" is commonly used in referring to bearings of this general class, and is so used throughout the present specification and claims, it is to be understood that any other suitable pressurized gas may be employed in the present invention instead of air for both bearing and propelling purposes. As used herein, therefore, the term "air" shall mean "air or other suitable gas."

A stationary inner jet drive member C is mounted coaxially within the bearing bore 10, and is provided with jet nozzles in the form of bosses 17 which discharge air jets, indicated by arrows 18, against the inner surface of the drum A, and as near tangentially thereto as practicable.

Referring to the drawings in detail, the illustrated bearing member B comprises a base portion 19 and an upper portion 20. The two bearing portions 19 and 20 are secured together by die bolts 21, and the cylindrical bore 10 is provided in the assembled bearing member. The drum A is fitted into this cylindrical bore 10 with air bearing clearance 14 therefrom. This clearance may correspond to that provided for a conventional oil-type bearing. For example, with a drum having an outside diameter of approximately one inch, a bearing clearance space of approximately .001″ may be provided.

Compressed air for the bearing clearance space 14 is supplied at a required pressure, for example, of the order of 40 to 100 p.s.i. above atmospheric, to a main supply tube 22 and flows thence through a first header tube 23, then through lateral passages 27, 28, 29 and 30 to other header tubes 31, 32 and 33, which communicate with jet passages 34. The latter are disposed substantially radially of the bore 10. The air is discharged into the bearing space 14 through the jet orifices 15 at the inner ends of the jet passages to provide air bearing support for the drum A.

The drum A is a tubular, and preferably is of light weight material such as, for example, plastic material. The strength and rigidity of the drum is immaterial, since the air bearing in which it is entirely enclosed tends to support it and to retain it against radial expansion when rotating at high speed. In fact, the drum A may be extremely thin, for example, in the form of a flexible film or sleeve, so that when at rest it will not even retain its own cylindrical shape.

The magnetic coating 35 on the drum may be of any suitable material, such as, for example, the well known iron oxide. It may be applied to the drum in any suitable manner, such as by brushing, spraying, rolling, plating or otherwise, since the coating, and its manner of application, are not, per se, features of the invention.

The transducer head insert 12 may comprise a pair of similar, but opposite, complementary strip members 37 and 38 fitted together in preferably air tight sealed relation with each other and with the sides surrounding the opening 13 into which they are fitted. The transducer heads 11 preferably are small, and are sealed into registering recesses provided therefor in the strips 37 and 38. Although in the drawings the heads 11 are shown as being spaced rather far apart in order to avoid complicating the drawing, they preferably will be mounted very close together. This is possible with the present invention, since, as will be brought out later herein, the heads 11 can be mounted very close to the recording coating 35.

Usual conductor wires 39 are connected to each of the transducer heads 11, and these conductors are carried lengthwise of the insert 12 in a passage 40 provided by registering grooves in the members 37 and 38. The conductor wires emerge from the insert 12 through a hole 41 for connection to such circuits as may be desired.

It is well known that air bearings tend to provide highly concentric support for a member journaled therein. In the present instance the entire peripheral recording surface 35 of the drum A has air bearing support in the bearing member B. Since there are no variations of load on the drum during use, said load being only the negligible weight of the drum itself, the air bearing provided within the space 14, backed by the strong, rigid bearing member B, resists radial expansion of the drum A by the centrifugal force to which the drum is subjected during its rotation. Therefore, the concentricity and lack of run-out of the recording coating 35 during operation is extremely high, approaching one hundred percent. Because of this high concentricity and lack of run-out, the transducer heads 11 may be mounted very close to the recording coating 35, for example, within .0001" or less therefrom.

The inner jet drive member C comprises a tubular shell portion 44 having an integral, threaded base portion 45 thereof screwed into a threaded opening 47 provided therefor in an abutment member 48 secured by die bolts 49 to an extension 50 of the bearing base member 19. The tubular shell portion 44 is fixedly mounted coaxially within the bearing bore 10 in the bearing member B, and is sealed by a disk 51 at its opposite end from that screwed into the abutment 48.

The shell portion 44 is of substantially smaller diameter than the interior of the drum A, and a plurality of the jet nozzle bosses 17, in sets of four each, are provided at selected intervals lengthwise of the shell 44. These bosses 17 are of a height to terminate short of the interior of the tubular drum A.

A jet passage 54 is provided through each of the bosses 17 and terminates at its outer end in a discharge orifice 55. The inner end of each of the jet passages 54 communicates with the interior of the tubular shell portion 44. An air supply tube 57 opens into the otherwise closed, threaded base portion 45 of the inner jet member A, and is adapted to be connected to a suitable supply of compressed air, which may be the same as that to which the supply tube 22 for the outer or bearing jets 18 is connected.

Thus, air at a required pressure introduced into the tubular shell member 44 flows through the jet passages 54 and is discharged from the jet orifice 55 in jets indicated by the arrows 18. These jets impinge against the inner surface 59 of the drum A at an acute angle to a radial plane of the tubular shell 44 passing through the orifice 55. The viscous drag of the air from these jets on the inner drum surface tends to rotate the drum A in the direction of the jets.

The substantial difference in diameter between the inner jet drive member C and the interior of the drum A provides a large clear space 60 therebetween, and thus alloys easy egress for the air of the jets 18 at both ends of the drum.

In using the magnetic data storage mechanism shown in FIGS. 1–3 the main supply tubes 22 and 57 are connected to suitable supplies of air or other suitable gas at a pressure substantially above atmospheric, for example, of the order of 40–100 p.s.i. Both of these main supply tubes may, if desired, be connected to a common supply of suitably compressed air. The conductors 39 also may be connected to suitable circuits, not shown.

Air, flowing through the main supply tube 22 for the outer, or bearing jets 18, flows along the first header duct 23 and thence through the lateral passages 27, 28, 29 and 30 to the other header ducts 31, 32 and 33. Thence the air flows through the jet passage 34 and the jet orifices 15 into the bearing space 14 to provide air bearing support for the drum A throughout its entire length.

Pressurized air for driving the drum A also flows through the main supply tube 57 into the tubular shell 44 and thence through the jet passages 54 and is discharged at high velocity through the jet orifices 55. The inner or driving jets 58 impinge at an angle approaching tangency against said inner drum surface, and the viscous drag of their air along the interior of the drum urges the drum to rotate. Since the frictional resistance of an air bearing is from 100 to 10,000 times less than that of conventional ball and oil type bearings, this impingement of the air jets on the inner face of the drum causes the latter to rotate at extremely high speeds, for example, of the order of 80,000 r.p.m. and more. The speed of drum rotation can be controlled by regulating the number and speed of the jets emerging from the inner jet passages 54. Increasing either of these two factors tends to increase the speed of drum rotation.

Figure 4:
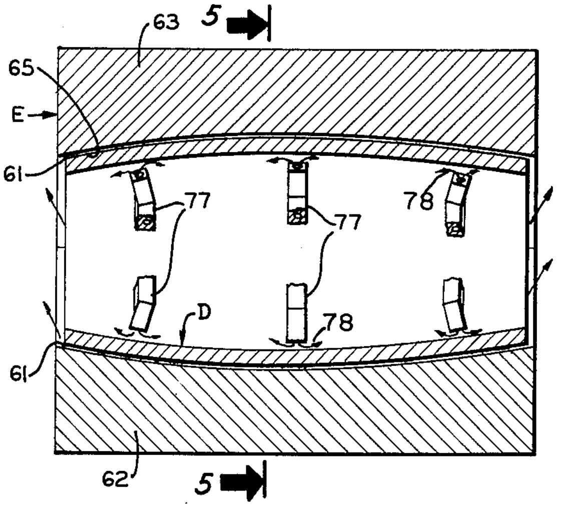
FIG. 4 is a diagrammatic, longitudinal, sectional view through a modified form of drum mechanism from that shown in FIGS. 1–3, portions on an inner jet drive member being broken away.
Figures 5, 6:
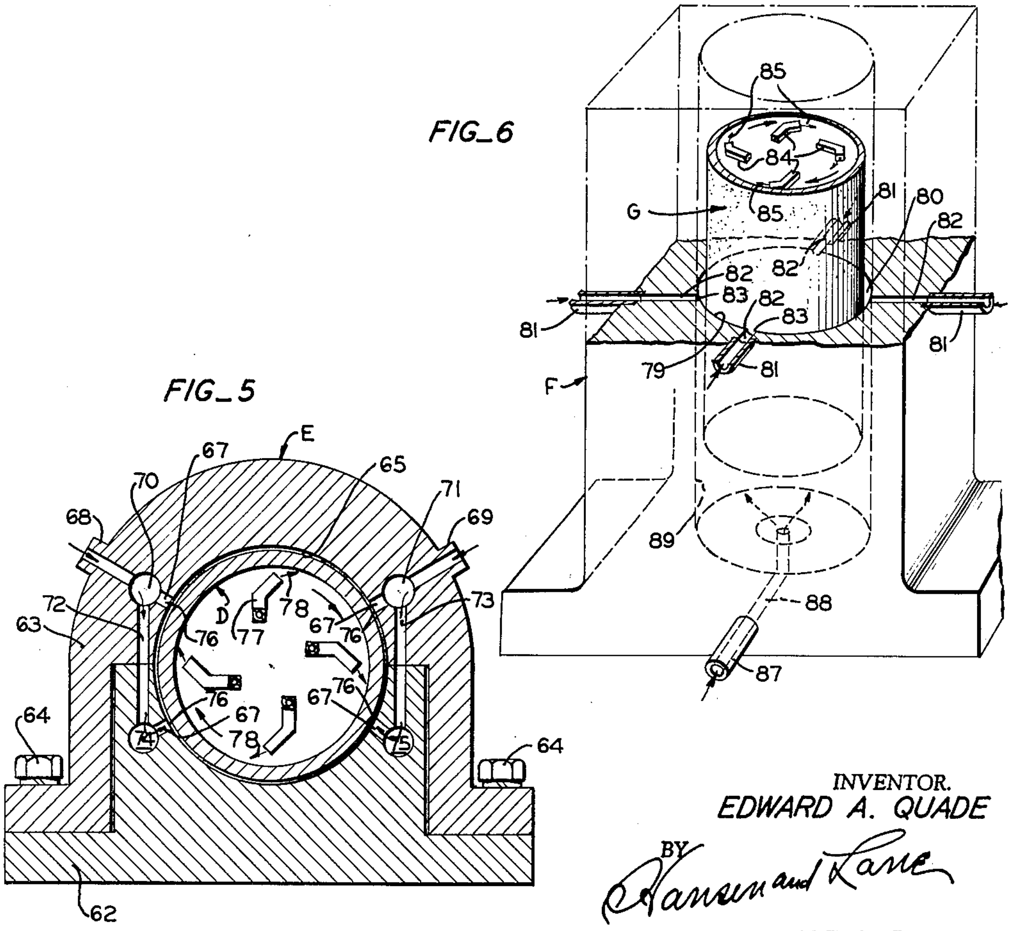
FIG. 5 is a diagrammatic, transverse, sectional view taken along line 5—5 of FIG. 4.
FIG. 6 is a diagrammatic perspective view of a further modified form of drum mechanism from that shown in FIGS. 1–5, the inner portion of the jet drive member and the upper portion of the bearing member being broken away.

In the modified form of the invention shown in FIGS. 4 and 5, and also in the further modified form shown in FIG. 6, the transducer heads have been omitted for the purpose of simplifying the drawings. It is to be understood, however, that transducer heads may be provided in the structures of FIGS. 4, 5 and 6 for example, as shown in FIGS. 1–3.

Referring to the modified form of the invention shown in FIGS. 4 and 5, a generally barrel-shaped drum D is journaled, with air bearing clearance 61, in a bearing member E. The bearing member E comprises a base portion 62 and an upper portion 63 fitted and secured together by bolts 64. A bearing bore 65 of general barrel shape corresponding to that of the drum D is provided in the bearing member E. A plurality of radially extending jet passages 67 (FIG. 5) are provided to discharge air into the bearing clearance space 61 between the drum D and the bearing member E in which the former is journaled. Air, at suitable pressure, for example, corresponding to that described for use with the structure shown in FIGS. 1–3, is introduced through supply tubes 68 and 69, and thence flows through first header ducts 70 and 71, lateral passages 72 and 73, and second header ducts 74 and 75, into the jet passages 67, whence it is discharged into the bearing space 61 through discharge orifices 76.

A plurality of stationary inner jet drive nozzles 77, acting similarly to the nozzle bosses 53 shown in FIGS. 1–3, are fixedly mounted interiorly of the drum D to discharge air jets indicated by the arrows 78 to drive the drum D within its air bearing support similarly to the drum A of FIGS. 1–3. The barrel shape of the drum A and of the bearing bore 65 within which the former is mounted tends to center the drum longitudinally of the bearing member and thus prevents longitudinal displacement of the drum during operation. Otherwise the features and operation of the mechanism shown in FIGS. 4 and 5 correspond generally to those of the mechanism shown in FIGS. 1–3.

Referring now to the further modification of the invention shown in FIG. 6, a strong, rigid bearing member E has a cylindrical bearing bore 79 therein, and a tubular drum G, closed at its lower end, is journaled with air bearing clearance 80 therein. Pressurized bearing air for the clearance space 80 is provided from supply tubes 81 through jet passages 82, and jet orifices 83. A plurality of stationary driving jet nozzles 84, corresponding to the nozzles 77 in FIG. 4 and the nozzles 17 in FIGS. 1–3, are mounted interiorly of the drum G. Air jets indicated by the arrows 85 are discharged from these nozzles as nearly tangentially as practicable against the inner surface of the drum G.

For axially adjusting the position of the drum G lengthwise of the bearing member E, air under controlled pressure and in controlled volume is introduced through a supply tube 87 and an air passage 88 into the space 89 between the closed lower end of the drum and the lower end of the bearing bore. The lower end of the drum, being closed, is acted upon as a piston by variations in the volume and pressure of air in the space 89 for movement of the drum to axially adjusted position along the bearing bore 79.

The invention provides a magnetic drum capable of high speed of operation and high bit density, and one wherein the air bearing within which the drum is mounted resists radial expansion of the drum by centrifugal force produced by its high speed rotation. This results in a mechanism capable of "writing" and "reading" magnetic data bits at extremely high speed.

While I have illustrated and described a preferred embodiment of the present invention, and modified forms thereof, it will be understood, however, that various changes and modifications may be made in the details thereof without departing from the scope of the invention as set forth in the appended claims.

Having thus described the invention, what I claim as new and desire to protect by Letters Patent is defined in the following claims.

I claim.

1. A combined air bearing support and air drive for a high speed drum, comprising a rigid bearing member having a bearing bore therein, a hollow drum the periphery of which is enclosed by, and is journaled with air bearing support within the bore member, and jet drive means mounted interiorly of the drum and inwardly clear thereof, said jet drive means being positioned and arranged to discharge a plurality of air jets against the interior of the hollow drum with each jet disposed transversely to a radial plane of the drum through the jet, thereby to drive the drum rotatively within its air bearing support, while the latter prevents radial expansion of the drum under centrifugal force at high rotative drum speeds.

2. An arrangement according to claim 1 wherein the jet drive means is spaced inwardly from the drum a distance several times the thickness of the air bearing between the bearing member and the drum, thereby to provide free egress of the jet air endwise of the drum.

3. An arrangement according to claim 1 wherein the air bearing extends the entire length of the drum, thereby to resist radial expansion of the drum by centrifugal force.

4. A combined air bearing support and air drive for a high speed drum, comprising, a bearing member having a bearing bore therein, a hollow drum substantially shorter than the bearing bore journaled with air bearing support therein, and free for endwise movement therein, jet drive means mounted interiorly of the drum and inwardly clear thereof, said jet drive means being positioned and arranged to discharge a plurality of air jets against the interior of the drum transversely to a radial plane of the drum through the jet, thereby to drive the drum rotatively within its air bearing support, and means for exerting air pressure endwise of the drum for moving the latter axially within the bore.

5. An arrangement according to claim 4 wherein one end of the bearing bore is closed and closure means is provided transversely of the drum, and the air pressure for axially moving the drum is exerted by the introduction of pressurized air into the bore between the closed end of the bore and the drum closure means.

6. A combined air bearing support and air drive for a high speed drum, comprising, a bearing member having a bearing bore therein, said bore being of larger diameter medially of its length than at its ends, a hollow drum of a shape corresponding to that of the bore journaled with air bearing support within the bore of the bearing member, jet drive means mounted interiorly of the hollow drum and inwardly clear thereof, said jet drive means being positioned and arranged to discharge a plurality of air jets against the interior of the drum with each jet disposed transversely to a radial plane of the drum through the jet, thereby to drive the drum without endwise displacement rotatively within its air bearing support.

7. A combined air bearing support and air drive for a high speed drum, comprising, a strong, rigid bearing member having a cylindrical bore therein, said bore being closed at one end thereof, a tubular drum having a transverse closure therein and journaled with bearing clearance in the bore of the bearing member to provide an air chamber between the closed end of the bore and the closed end of the piston, means for introducing pressurized air into the bearing clearance between the drum and the bore to provide an air bearing for the drum in the bore, a plurality of stationary jet nozzles interiorly of the hollow drum, each nozzle being positioned to discharge an air jet therefrom against the inner surface of said drum transversely to a radial plane of the bore through the jet, whereby the viscous drag of the air from said jets on the inner surface of the drum urges the drum rotatively about its axis within its air bearing, means urging the drum axially thereof toward the closed end of the bore, and means for introducing pressurized air into said air chamber for urging the drum axially away from the closed end of the bore.

8. An arrangement according to claim 7 wherein the bearing member is mounted with the bearing bore axially upright and the means for urging the drum toward the closed end of the bore is the force of gravity.

9. A combined air bearing support and air drive for a high speed drum comprising a strong, rigid bearing member having a bore of circular cross-sectional shape therein, a tubular, drum journaled with bearing clearance in said bore, means for introducing pressurized air into the bearing clearance at selected points throughout the bore of said bearing member for providing an air bearing for the drum, a plurality of jet nozzles fixedly mounted coaxially within the bore of the bearing member and spaced inwardly from the drum, each of said nozzles being positioned to discharge a jet of air therefrom against the inner surface of the drum and transversely to a radial plane of the bore through the jet, thereby to drive the drum rotatively within its air bearing.

10. A combined air bearing support and air drive for a high speed drum, comprising, a rigid bearing member having a bearing bore of circular cross-sectional shape, a hollow drum journaled and wholly contained within the bore of said bearing member and with bearing clearance therefrom, means for introducing pressurized air into the bearing clearance between the drum and the bearing member to provide an air bearing for the drum, and inner jet drive means mounted stationarily within the hollow drum and arranged to discharge a plurality of air jets therefrom against an inner surface of the drum transversely to a radial plane of the bore intersecting each air jet, thereby to urge the drum rotatively within its air bearing.

11. An arrangement according to claim 10 wherein the inner drive member is spaced inwardly from the interior of the hollow drum by a distance several times the amount of bearing clearance of the drum in the bearing member, thereby to provide free exit of the air from the jet drive means endwise of the drum.

References Cited in the file of this patent

UNITED STATES PATENTS

| | | |
|---|---|---|
| 2,511,543 | Rawlins | June 30, 1950 |
| 2,602,632 | Serduke | July 8, 1952 |
| 2,752,197 | Marco | June 26, 1956 |
| 2,771,595 | Hendrickson | Nov. 20, 1956 |
| 2,883,475 | Ridler | Apr. 21, 1959 |